| United States Patent [19]
Barton et al.

[11] Patent Number: 4,918,530
[45] Date of Patent: Apr. 17, 1990

[54] PROCESSING OF VIDEO IMAGE SIGNALS

[75] Inventors: Nicholas Barton, Wokingham; Robert Billing, Crowthorne, both of United Kingdom

[73] Assignee: Questech Limited, Wokingham, United Kingdom

[21] Appl. No.: 398,540

[22] Filed: Aug. 25, 1989

Related U.S. Application Data

[63] Continuation of Ser. No. 148,612, Jan. 26, 1988, abandoned.

[51] Int. Cl.⁴ ............................................. H04N 5/272
[52] U.S. Cl. .................................................... 358/183
[58] Field of Search .................. 358/183, 182, 22, 150

[56] References Cited
U.S. PATENT DOCUMENTS
4,698,682 10/1987 Astle ....................................... 358/22

4,743,970 5/1988 Barnett ................................. 358/183

Primary Examiner—Tommy P. Chin
Attorney, Agent, or Firm—Berman, Aisenberg & Platt

[57] ABSTRACT

A video image processing system for generating so-called "multi-freeze" digital video effects comprises a frame store (14) within which an image signal can be stored for application to a combining circuit (4) together with a background image signal (1) providing a background against which a trail of frozen images is to be displayed. The trail of images is derived by recycling images stored in the memory (14) through a further combining circuit (19) wherein the stored image is combined with incoming image signals applied to both combining means (4,19). Decay and patterning of the frozen images can be effected by circuits (24,25) for attenuating and profiling the key signals accompanying the image signals.

5 Claims, 1 Drawing Sheet

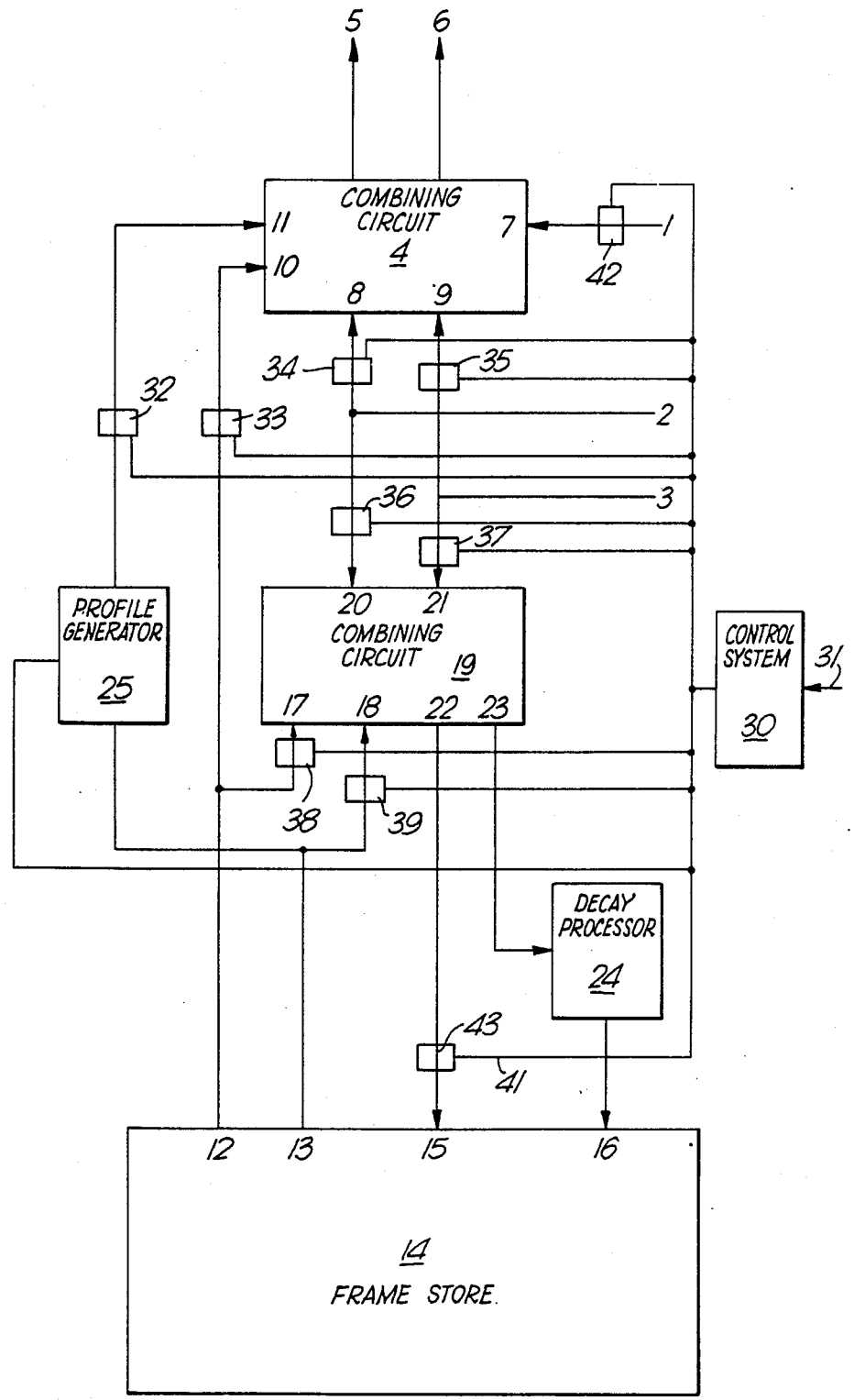

PROCESSING OF VIDEO IMAGE SIGNALS

This is a continuation of application 07/148,612, which is now abandoned.

This U.S. Application is related to applications 148,611; 148,609;, now U.S. Pat. Nos. 4,847691, and 148,610, all of which were filed on Jan. 26, 1988, the disclosures of which are incorporated herein by reference.

BACKGROUND OF THE INVENTION

This invention concerns improvements in the processing of video image signals to achieve so-called digital video effects.

In such processing, each field frame of a television image is stored as a series of discrete digital values or pixels containing the luminance or chrominance information of the original signal and obtained by sampling the original signal at an appropriate pixel repetition rate. The original signal may be reproduced by scanning the store, or, by addressing the store in appropriately timed relation to synchronising signals defining the television raster, selected image information can be retrieved from the store and displayed on a television screen in any desired position or orientation. Such retrieved information may be combined with other image information to produce a pattern or collage or discrete images, and by moving the boundaries between respective patterns containing the separate picture information, various effects can be achieved.

One such effect is that known as "Multifreeze" wherein an image area that is shown as moving against a background is caused to leave a trail of frozen images behind it.

SUMMARY OF THE INVENTION

It is an object of the present invention to provide an improved system to achieve such effects.

In accordance with one aspect of the invention, there is provided a video image processing system comprising means for receiving a first video signal from a signal source intended to provide a background or background image, means for receiving a second video signal from a signal source intended to define a moving image to be depicted against the background provided by the first signal in conjunction with a key signal defining the image area to be occupied by said moving image in each frame of the video image, means for storing information derived from the said second signal and the associated key signal in each field period of the second signal, means for processing said second signal and said key signal prior to storage of said information therefrom in order to combine said information with information correspondingly stored during a previous field period, and further processing means arranged to provide a composite video output signal by combining said first and second signals and the processed and stored second signal and to provide a composite key signal by combining the incoming key signal with the processed and stored key signal.

Preferably the said first processing means is associated with further means for reducing the value of the processed key signal prior to storage thereof. This reduction is preferably variable and introduces a decay into the key signal so that a frozen image reproduced by retrieval from the source will correspondingly fade in the reproduced image although the corresponding image signal is retained at full amplitude.

Advantageously this decay processor may include a texture generator in order to introduce a pattern into the fading image.

A further processor may be arranged to modify the processed and stored key signal before it is combined with the incoming key signal in order to introduce further effects into the frozen image or images to be displayed.

BRIEF DESCRIPTION OF THE DRAWING

The single figure is a block circuit diagram of one embodiment of video image processing system in accordance with the invention.

DETAILED DESCRIPTION OF PREFERRED EMBODIMENT

Referring to the drawing, the reference numeral 1 indicates a source of a video signal which is to provide a background against which a moving image or image pattern is to be displayed. Such a background may or may not contain picture information, and may show either a stationary or moving image.

The reference numeral 2 indicates a source of a video signal providing image information which is to be shown as moving against the background provided by the signal from the source 1.

The signal from the source 2 is associated with a so-called key signal provided from a source 3 in order to indicate the area or areas within the frame of the video image to contain the picture information provided by the signal from source 2.

The signals from sources 2 and 3 may be derived from a digital video effects system in a manner well-known to one skilled in the art. Thus the signal from source 2 may be derived from a storage and interpolation system of the kind described in our co-pending Patent Application Ser. No. 148,609, filed concurrently herewith, and the key signal from source 3 may be derived from a pattern generating system of the kind described in our co-pending Application Ser. No. 148,611, also filed concurrently herewith. Alternatively, the signals might be derived from a system for providing a composite of a number of signals, such as described in our co-pending Application Ser. No. 148,610, also filed concurrently herewith.

Typically, the key signal from source 3 is provided as a number in the range 0–128, the numeral 128 indicating which areas of the screen contain picture and the numeral 0 indicating which areas are to be blank. At the edges of active picture the key signal changes smoothly between the two values, and may also take intermediate values within the active picture area in order to indicate a picture which is partially present in a number of different senses. For example the key signal may be reduced in value evenly over the whole area in order to make the picture transparent, it may be wholly or partially removed in selected areas to change the shape of the picture or it may be varied with apparent distance of the image from the plane of the screen in order to make the picture vanish into the background.

The reference numeral 4 indicates a signal combining circuit which, in known manner, is arranged to provide a composite of the incoming picture image signals at an output 5, and a composite of incoming key signals at output 6. The combining circuit is arranged to receive the background picture information from source 1, at an input 7, and the signals from sources 2 and 3 at inputs 8 and 9 respectively.

The combining circuit 4 has further inputs 10 and 11 which are arranged to receive corresponding picture image and keying signals from outputs 12 and 13 of a store 14. The store 14 is arranged, in known manner, to receive and store picture image information corresponding to one image frame, during each field of a video signal, and likewise to receive and store during the same field period, the corresponding values of key signal. The picture image and key signals are provided to inputs 15 and 16 of the store, and the arrangement is such that as the signal information derived during each field period is written into the store via inputs 15 and 16, the picture image and key signal information stored during a previous field of the video signal can be read from outputs 12 and 13.

The outputs 12 and 13 of the store are coupled to inputs 17 and 18 of a further combining circuit 19, inputs 20 and 21 of which are also coupled to the signals sources 2 and 3. Thus the combining circuit 19 serves to combine the picture image and key signals received on the one hand from the sources 2 and 3 and on the other hand from the outputs 12 and 13 of the store 14, and to provide composite picture and key signals at outputs 22 and 23. Between the output 23 of combining circuit 19 and the input 16 of the store 14, there is provided a circuit 24 which serves to attenuate the key signal prior to storage and thereby to introduce a controlled decay into this signal for the purpose described below.

Likewise, there is provided between the output 13 of store 14 and the input 11 of combiner 4 a further circuit 25 which serves to modify the key signal read from the store 14 in order to introduce a controlled profile into the signal, also for the purpose to be described below.

The operation of the circuit described above is as follows:

Each combiner circuit 4 and 19 produces a video signal output at 5 or 22 which is not reduced in amplitude but which contains contributions from the various inputs mixed in proportions which add to unity. If only one input is in use on a particular combiner then the video signal from that outputs is identical to the input video signal in use, regardless of the value of the associated key signal.

A control system 30, typically a microprocesor, which may be subject to manual control 31, is able to switch on and off each input to each combiner by switches 32-39, and to replace the background input from source 1 or the video going to the store 14 from source 2, or both, with an electronically generated flat colour supplied at inputs 40 and 41 and controlled by switches 42 and 43.

The system described can provide a variety of effects depending upon selected combinations of actuated states of the switches 32-39, 42 or 43 as determined by the control input 31.

Thus, assuming that the source 2 provides an input image to be shown within an area defined as moving across a background by means of a key signal applied at input 3, the final image mixed by the combiner 3 will contain the image components provided by the background from source 1 and/or the moving information from source 2 and/or image information retrieved from the store 14 and to be displayed as trailing the moving image from source 2. The residual image information provided by store 14 will be frozen in the recycling effect of the store 14.

Before the data from the combiner 19 is written into the store 14 it is further processed by the decay processor 24 which reduces the value of the key signal by an amount determined by the control system 30. This may be set to zero allowing the key to pass unchanged.

This mechanism allows the key to be progressively varied over a period of time. If the picture is present at a particular place on the screen on a particular field then the combiner 19 will set the value of the key going to the decay processor 24 to be at least the value of the key associated with the live picture. The decay processor 24 will reduce this value before it is written into the store. If on the next field of the same square (two fields later) the live picture has moved on then the combiner 19 will produce as its output key the value present in the store. This will be reduced again by the decay and so on. The net effect of this is that a picture moved across the screen will leave behind it a trail of frozen video in the video store and a trail of decaying key in the key store.

The decay processor 24 is itself controlled by a texture generator which can be a part of the control system 30 and which divides the screen area into a number of areas, typically thirty two pixels by thirty two lines, which are the repeats of a repeating pattern. Each repeat is split in half both horizontally and vertically giving four sub-repeats of sixteen lines by sixteen pixels. The control system 30 selects on of a library of standasrd shapes held in read only memory as sixteen by sixteen dot drawings and makes four copies of the shape in the four sub-repeats. The control system 30 can select, for each sub-repeat, the orientation of the shape within the sub-repeat. Having thus covered the entire screen with a repeating pattern of bits, the texture generator modifies the rate of decay according to the state of the bit at each pixel in such a way that the pattern becomes visible in the decaying trail of frozen images provided on the image screen.

The key data coming from the store 14 is passed through the profile generator 25 before being sent to the output combiner 4. The profile generator processes the decaying key before sending it to the output combiner. It applies a variety of functions selected by control 31, some of them non-linear, to the key. The effect of this is to allow the way in which the trail decays to be set. For example the trail can decay linearly with time, decay quickly at first then slow down, remain at full intensity for a time then disappear suddenly or disappear and come back several times.

Thus it will be seen that an arrangement in accordance with the invention provides a novel and advantageous means for providing a variety of visual effects.

We claim:

1. A video image processing system comprising a recycling frame store having first and second inputs for receiving respectively a video image signal and an associated key signal and first and second outputs for providing respectively, during each field of said video image signal applied at the first input a corresponding video image signal and associated key signal which were stored during the previous field; a first combining circuit having third and fourth signal inputs for receiving respectively a first video image signal and an associated key signal, fifth and sixth signal inputs coupled to receive signals from the said first and second outputs of said recycling frame store and third and fourth signal outputs coupled to provide signals to said first and second signal inputs of said recycling frame store, said first combining circuit providing at said third output a composite of the signals received at the said third and fifth inputs and providing at said fourth output a composite of the signals received at said fourth and sixth inputs; a second combining circuit having seventh and eighth signal inputs connected to receive respectively said first video signal and the associated key signal associated, ninth and tenth signal inputs coupled to receive signals from said first and second inputs of said recycling frame store, an eleventh signal input for receiving a second video signal, and fifth and sixth signal outputs, said second combining circuit providing at said fifth signal output a composite of the signals provided at said seventh, ninth and eleventh signal inputs and providing at said sixth signal output a composite of the signals provided at said eighth and tenth signal inputs.

2. A video image processing system according to claim 1, further comprising means for reducing the value of said fourth output signal prior to storage thereof.

3. A video image processing system according to claim 2, wherein said means for reducing is controllable to enable variable attenuation of said fourth output signal.

4. A video image processing system according to claim 1 further comprising means to modify the second output signal before it is combined with the eight input signal to introduce further effects into the image to be displayed.

5. A video image processing system according to claim 4, wherein said means to modify is arranged to introduce a pattern, said second output signal.

* * * * *